US012713098B1

(12) United States Patent
Giddi et al.

(10) Patent No.: US 12,713,098 B1
(45) Date of Patent: Aug. 18, 2026

(54) SYSTEM AND METHOD FOR CORRECTING A PROGRESS INDICATOR DURING PLAYBACK OF A VIDEO FILE

(71) Applicant: Connaught Electronics Ltd., Tuam (IE)

(72) Inventors: Satya Syamala Rao Giddi, Troy, MI (US); Pratham Kumar Shettigar, Troy, MI (US); Anand Kathiresan, Troy, MI (US)

(73) Assignee: Connaught Electronics Ltd. (IE)

( * ) Notice: Subject to any disclaimer, the term of this patent is extended or adjusted under 35 U.S.C. 154(b) by 0 days.

(21) Appl. No.: 19/214,732

(22) Filed: May 21, 2025

(51) Int. Cl.
*H04N 21/472* (2011.01)
*H04N 21/84* (2011.01)

(52) U.S. Cl.
CPC ....... *H04N 21/47217* (2013.01); *H04N 21/84* (2013.01)

(58) Field of Classification Search
CPC ......................... H04N 21/47217; H04N 21/84
See application file for complete search history.

(56) References Cited

U.S. PATENT DOCUMENTS 10,654,423 B2 5/2020 Gupta et al.
12,035,044 B2 7/2024 Stimm et al.
2009/0067817 A1 3/2009 Chuang et al.
2010/0231797 A1* 9/2010 Jiang .................... H04N 19/895 348/E5.078
2012/0051546 A1* 3/2012 Tsurumoto ........... H04N 21/835 380/270
2019/0342608 A1* 11/2019 Watts ............... H04N 21/44008
2022/0415037 A1 12/2022 Zhang et al.
2025/0192986 A1* 6/2025 Miyamoto ............. G06F 21/64

FOREIGN PATENT DOCUMENTS

WO 2018087348 A1 5/2018
WO 2019213371 A1 11/2019

* cited by examiner

*Primary Examiner* — Kyu Chae
(74) *Attorney, Agent, or Firm* — Dickinson Wright PLLC

(57) ABSTRACT

Methods and systems for correcting a progress indicator during playback of a video file. A request to playback the video file generated from a plurality of vehicle cameras is requested. A header associated with the video file to extract metadata is parsed. The metadata includes a frame count of the video file and a file size of the video file. The method includes determining that the header is corrupt based on the frame count being zero and generating a replacement frame count based on the file size of the video file, a frame size, and a scaling factor. The progress indicator during the playback based on the replacement frame count is displayed.

20 Claims, 3 Drawing Sheets

SYSTEM AND METHOD FOR CORRECTING A PROGRESS INDICATOR DURING PLAYBACK OF A VIDEO FILE

TECHNICAL FIELD

The present disclosure relates to methods and systems for an automotive recording system, and in particular, to a method for correcting a progress indicator during playback of a video file.

BACKGROUND

Automotive recording systems—including front-facing, rear-view, and side mirror cameras-commonly store data in the AVI (Audio Video Interleave) format on removable media such as SD cards. During normal operation, the system encodes and writes video data in real time and finalizes the AVI file by writing metadata to a header of a video file. The metadata includes, among other fields, a total frame count of the recorded video, which is essential for enabling playback systems to accurately display a progress bar and timer during video review.

However, in practice, recording sessions are often terminated abnormally due to sudden power loss, SD card removal, or system shutdown. When this occurs, before the AVI header is finalized, the total frame count may remain zero or invalid and therefore is corrupt. As a result, playback systems cannot accurately determine the length of the video or calculate playback progress. As a result, progress bars and timers either fail to function, stall at zero, or present misleading playback information.

SUMMARY

According to one embodiment, a method for correcting a progress indicator during playback of a video file is provided. The method includes: receiving a request to playback the video file generated from a plurality of vehicle cameras; parsing a header associated with the video file to extract metadata, wherein the metadata includes a frame count of the video file and a file size of the video file; determining that the header is corrupt based on the frame count being zero; generating a replacement frame count based on the file size of the video file, a frame size, and a scaling factor; and displaying the progress indicator during the playback based on the replacement frame count.

In another embodiment, a system configured to correct a progress indicator during playback of a video file is provided. The system includes a plurality of vehicle cameras configured to generate the video file and a display configured to display playback of the video file and the progress indicator associated with the video file. The system also includes a controller configured to: receive a request to playback the video file; parse a header associated with the video file to extract metadata, wherein the metadata includes a frame count of the video file and a file size of the video file; determine that the header is corrupt based on the frame count being zero; generate a replacement frame count based on the file size of the video file, a frame size, and a scaling factor; and display, on a vehicle display, the progress indicator during the playback based on the replacement frame count.

In another embodiment, a processor configured to execute instructions stored on a non-transitory computer-readable medium, wherein executing the instructions causes the processor to: receive a request to playback a video file generated from a plurality of vehicle cameras; parse a header associated with the video file to extract metadata, wherein the metadata includes a frame count of the video file and a file size of the video file; determine that the header is corrupt based on the frame count being zero; generate a replacement frame count based on the file size of the video file, a frame size, and a scaling factor; and display a progress indicator during the playback based on the replacement frame count.

DETAILED DESCRIPTION

Figure 1:
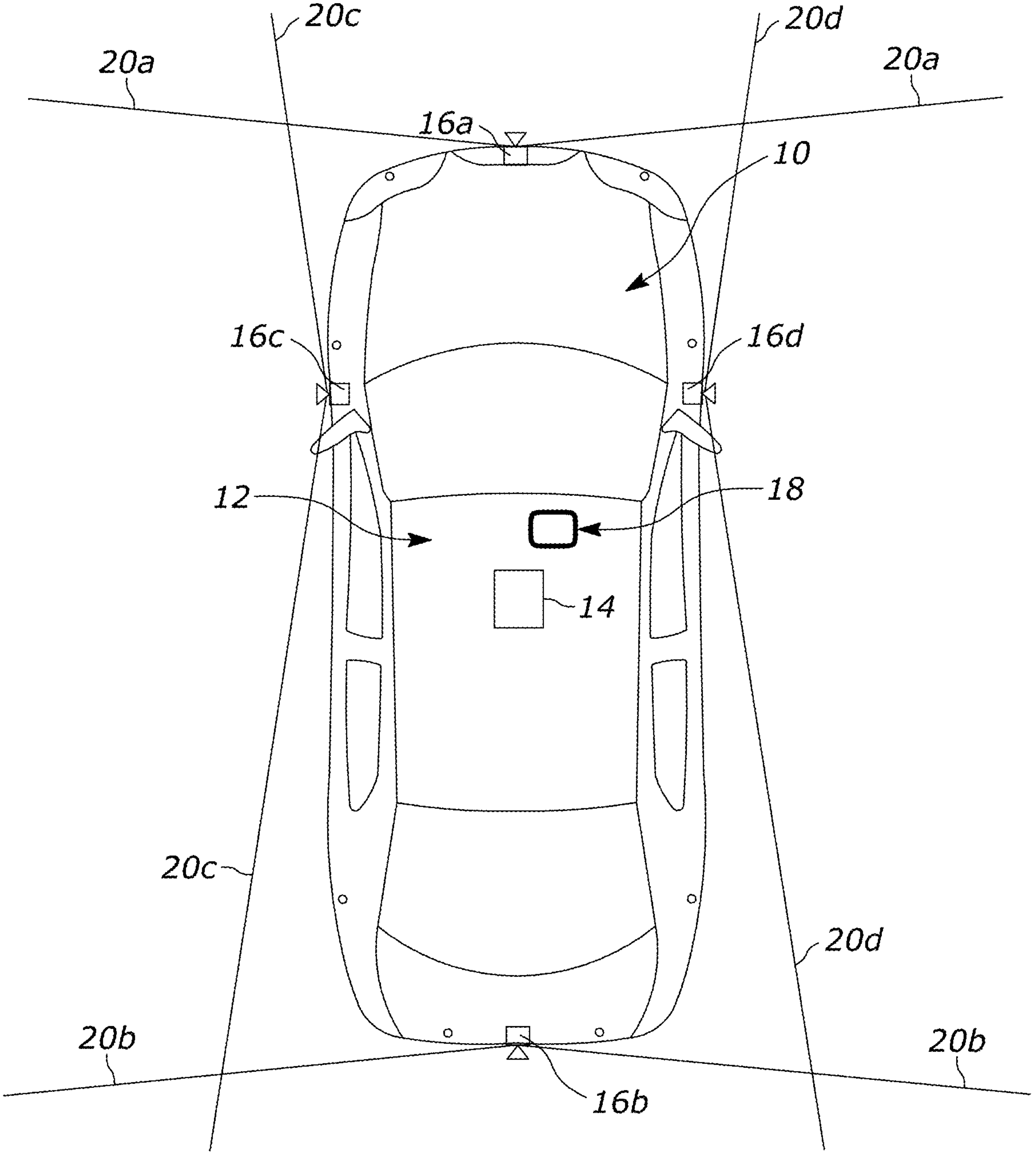
FIG. 1 illustrates a schematic of an example vehicle, shown from a top view, according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Automotive vehicles can be equipped with an automotive recording system—including front-facing, rear-view, and side mirror cameras—that records images and videos of their surroundings while driving and while parked. The recordings are commonly stored in the AVI (Audio Video Interleave) format on removable media such as SD cards. During normal operation, the system encodes and writes video data in real time and finalizes the AVI file by writing metadata to the header of a video file. The metadata includes, among other fields, a total frame count of the recorded video, which can be important for enabling playback systems to accurately display a progress bar and timer during video review.

Recording sessions are often terminated abnormally due to sudden power loss, SD card removal, or system shutdown. When this occurs, before the AVI header is finalized, the total frame count may remain zero or invalid and therefore is corrupt. As a result, playback systems cannot accurately determine the length of the video or calculate playback progress. As a result, progress bars and timers either fail to function, stall at zero, or present misleading playback information.

Therefore, according to embodiments disclosed herein, systems and methods for correcting a progress indicator during playback of the video file are disclosed. As will be described below, in embodiments, once the system determines that the video header is corrupt or invalid, the system will generate a replacement frame count for the header based on the file size of the video file, a frame size, and a scaling factor. By determining or estimating the overall playback based on the file size, the progress indicator can be provided with the replacement frame count, thus resulting in better user experience with video playback.

FIG. 1 illustrates a schematic of a vehicle 10 according to an embodiment, shown here from a top view. The vehicle 10 is a passenger car, but can be other types of vehicles such as a truck, van, or sports utility vehicle (SUV), or the like. The vehicle 10 includes a camera system 12 which includes an electronic control unit (ECU) 14 connected to a plurality of cameras 16*a*, 16*b*, 16*c*, and 16*d*. In general, the ECU 14 includes one or more processors programmed to process the images data associated with the cameras 16*a-d* and display the images data on a vehicle display 18.

The ECUs disclosed herein may more generally be referred to as a controller or processor. In the case of an ECU of a camera system 12, the ECU can be capable of receiving image data from the various cameras (or their respective processors), processing the information, and outputting instructions to identify and record the surroundings about a vehicle, for example. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to, upon execution by the processor, cause the object classification technique and algorithms described herein.

In the embodiment illustrated in FIG. 1, the cameras 16-*d* are located about different quadrants of the vehicle, although more than four cameras may be provided in the camera system 12. Each camera 16*a-d* may have a fish-eye lens to obtain images with an enlarged field of view, indicated by boundary lines 20*a-d*. In an example, a first camera 16*a* faces an area in front of the vehicle, and captures images with a field of view indicated by boundary lines 20*a*. The first camera 16*a* can therefore be referred to as the front camera. A second camera 16*b* faces an area behind the vehicle, and captures images with a field of view indicated by boundary lines 20*b*. The second camera 16*b* can therefore be referred to as the rear camera. A third camera 16*c* faces an area on the left side of the vehicle, and captures images with a field of view indicated by boundary lines 20*c*. The third camera 16*c* can therefore be referred to as the left camera, or left-side camera. The third camera 16*c* can also be mounted on or near the vehicle's left wing mirror, and can therefore be referred to as a mirror left (ML) camera. A fourth camera 16*d* faces an area on the right side of the vehicle, and captures images with a field of view indicated by boundary lines 20*d*. The fourth camera 16*d* can therefore be referred to as the right camera, or right-side camera. The fourth camera 16*d* can also be mounted on or near the vehicle's right wing mirror, and can therefore be referred to as a mirror right (MR) camera. As will be described further below, the ECU 14 can be configured to activate the cameras 16*a-d*, record and store images, display the images from the cameras 16*a-d* on the vehicle display 18, and do so based upon the surrounding environment. The processor(s) and associated memory in the ECU can also be programmed to perform the progress indicator correction described herein.

Figure 2:
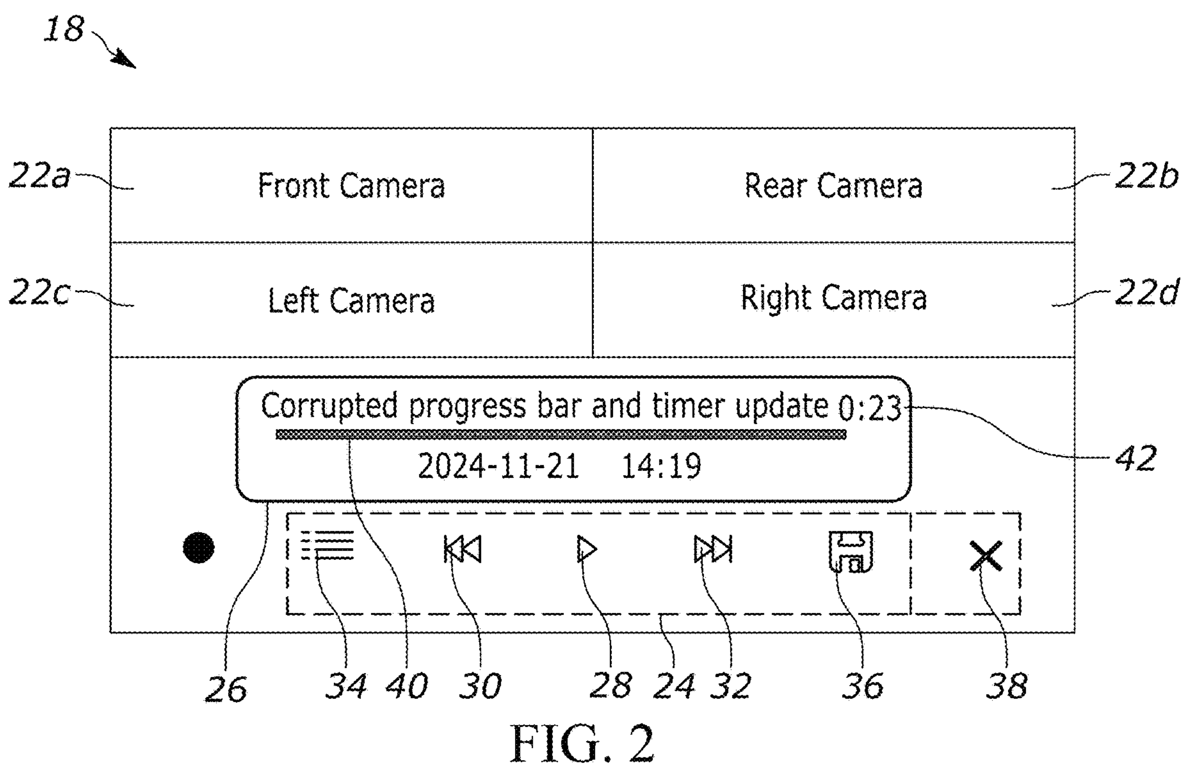
FIG. 2 illustrates an example of a video display with a progress indicator that is incorrect.
Figure 3:
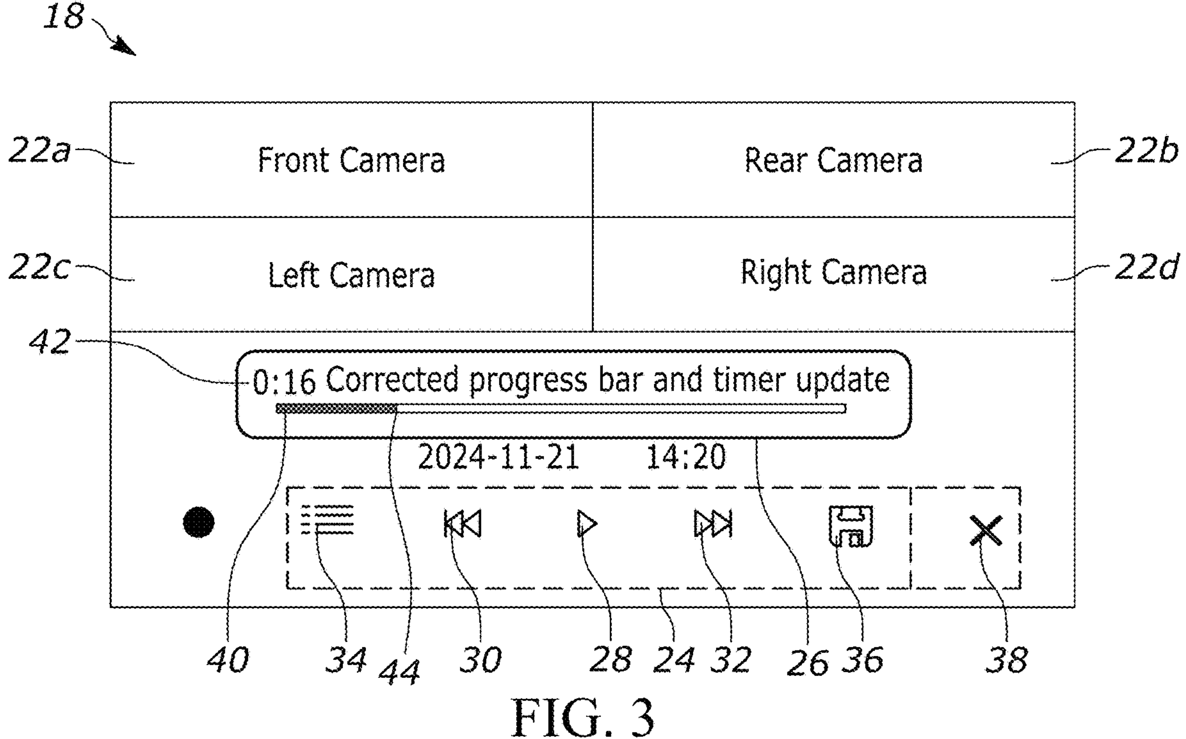
FIG. 3 illustrates an example of the video display with the progress indicator that is corrected.

FIG. 2 illustrates an example of the vehicle display 18 with a progress indicator 26 that is incorrect and FIG. 3 illustrates an example of the vehicle display 18 with the progress indicator 26 that is corrected. The vehicle display 18 is configured to present a plurality of image regions 22*a-d*, video playback controls 24, and the progress indicator 26 to a user. The vehicle display 18 may be implemented in one or more forms, including, but not limited to a vehicle-mounted infotainment display (e.g., a center console touchscreen), an instrument cluster display, a head-up display (HUD), a rearview mirror display, a mobile computing device (e.g., smartphone) communicatively connected to the vehicle, a wearable device, (e.g., smartwatch or smart glasses), or a portable computing device (e.g., laptop or tablet) communicatively connected to the vehicle. In embodiments involving devices external from the vehicle 10, the vehicle display 18 may be in communication with the vehicle 10 using a wired or wireless connection. The wireless connection may include, but is not limited to, Bluetooth, Wi-Fi, near-field communication (NFC), cellular (e.g., 4G/5G), or other suitable protocols. The vehicle 10 may transmit the video file, system settings, or control signals to the external devices for remote presentation and interaction.

The image regions 22*a-d* displays the image data from the cameras 16*a-d*. In the embodiment illustrated in FIGS. 2 and 3, the image regions 22*a-d* correspond to one of the cameras 16*a-d*. A first image region 22*a* displays the image data from the front camera 16*a*. A second image region 22*b* displays the image data from the rear camera 16*b*. A third image region 22*c* displays the image data from the left camera 16*c*. A fourth image region 22*d* displays the image data from the right camera 16*d*. In some embodiments, the image regions 22*a-d* may include more than four image regions and may include various views. For example, one or more of the image regions 22*a-d* may include displaying a top view of the vehicle 10, a wide-angle panoramic view of one of the cameras 16*a-d*, and/or other angles/views depending on an application or user selection. The image data may be a video or a still image. The image data from the cameras 16*a-d* are stored in the video file.

The video playback controls 24 includes, but is not limited to, a start/stop button 28, a rewind button 30, a fast-forward button 32, a menu button 34, a save button 36, and an exit button 38. The start/stop button 28 is configured to receive user input to initiate or pause playback of the video file. The start/stop button 28 may include visual indicators (e.g., play/pause icons) to indicate a current playback state (e.g., play and pause). The rewind button 30 is configured to receive user input to reverse playback of the video file. Upon activation, playback of the video file reverses at a predefined speed or in frame based increments, depending on the system settings. The fast-forward button 32 is configured to receive user input to advance playback of the video file. Upon activation, playback of the video file increases at a predefined speed or in frame based increments, depending on the system settings. The menu button 34, when selected, is configured to display a menu overlay comprising one or more selectable options. The menu may provide access to the system settings, additional playback settings, camera source selection, display configurations, or additional system features. The save button 36 is configured to initiate a save operation of the video file being displayed. Upon selection, a video segment, image frame, or predefined time window of the video file is stored to the memory or remote storage. The exit button 38 is configured to receive user input to terminate playback of the video file. Upon activation, the video file is removed from the vehicle display 18.

The progress indicator 26 is configured to convey a current playback position of the video file relative to a total duration of the video file. The progress indicator 26 may be implemented in one or more forms, including, but not limited to a progress bar 40, a circular dial, and/or a numerical indicator 42. The progress indicator 26 may be displayed within or adjacent to the image regions 22*a-d*, on or within an icon on the vehicle display 18, or on a portion of the vehicle display 18 and may be interactive or passive. In the embodiment illustrated in FIGS. 2 and 3, the progress indicator 26 is the progress bar 40 extending horizontally, along a portion of the vehicle display 18. In some embodiments, the progress bar 40 may extend vertically along a portion of the vehicle display 18. The progress bar 40 includes a marker 44, also referred to as a scrubber or seek handle, which visually tracks the current playback position. For example, this can include the playback indicator 26 depicting the marker 44 at 50% of the total length of the progress bar 40, therefore indicating the current playback position of the video file is 50% through the total duration of the video file. In some embodiments, the user may display a desired portion of the video file by touching or dragging the marker 44 along the progress bar 40. For example, this can include the user dragging the marker 44 to the middle of the progress bar 40, therefore the current playback position of the video file becomes 50% through the total duration of the video file. In some embodiments, the user may rewind or advance playback of the video file by touching a portion of the progress bar 40 to the left or right of the marker 44. For example, this can include the user touching a portion of the progress bar 40 to the left of the marker 44 to rewind playback of the video file or touching a portion of the progress bar 40 to the right of the marker 44 to advance playback of the video file. The rewinding or advancing of playback of the video file can alter the progress bar accordingly.

In another embodiment, the progress indicator 26 is the circular dial (e.g., radial gauge or ring-style progress indicator) surrounding the image regions 22*a-d* or positioned on the vehicle display 18. In some embodiments, the circular dial gradually fills in a clockwise/counter clockwise direction as playback progresses from the current playback position to the total duration, visually representing the percentage of the video file that has been played. For example, this can include the circular dial around a corner icon filling from 0% to 100% during the course of the playback, offering a continuous visual cue. In some embodiments, the circular dial changes colors as playback progresses from the current playback position to the total duration. For example, this can include the circular dial being green when the current playback position is between 0% and 25% of the total duration, being yellow when the current playback position is between 26% and 75% of the total duration, and being red when the current playback position is between 76% and 100% of the total duration.

In another embodiment, the progress indicator 26 is the numerical indicator 42 (e.g., percentage of completion, time remaining, and/or time elapsed) on the vehicle display 18. In the embodiment illustrated in FIG. 3, the numerical indicator 42 displays time elapsed (e.g., 0:16) from a start time of the video file (e.g., 0:00). In some embodiments, the numerical indicator 42 displays the time remaining from an end time of the video file (e.g., 2:52). In some embodiments, the numerical indicator 42 displays a percentage (e.g., 35%) representing a percentage of completion from the start time of the video and the end time of the video, and the numerical indicator 42 progresses from the start time to the end time.

The descriptions above of various examples of the progress indicator 26 are simply examples. Other types of indicators are intended to be included in the scope of this disclosure, and this disclosure is not limited to any particular type of progress indicator unless otherwise indicated.

Figure 4:
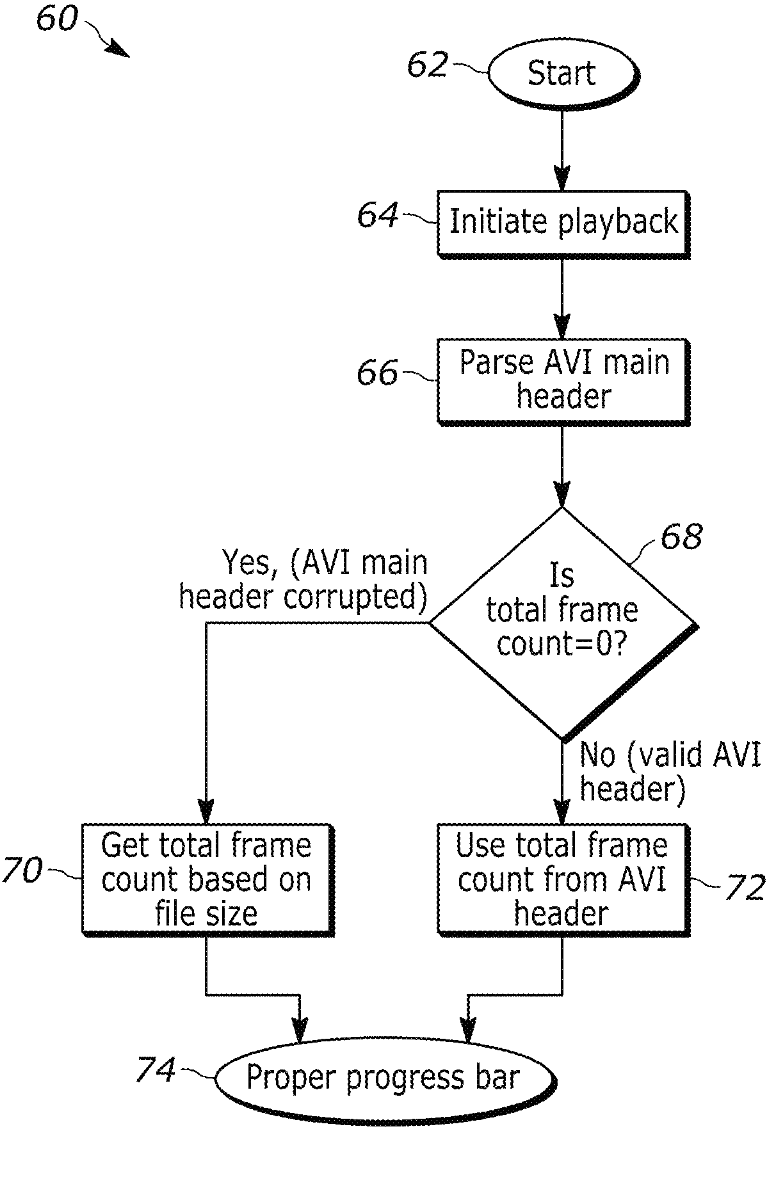
FIG. 4 illustrates an example method for correcting the progress indicator during playback of a video file.

FIG. 4 illustrates an example method 60 for correcting the progress indicator 26 during playback of the video file. In some implementations, one or more process blocks of FIG. 4 may be performed by the ECU 14. The method 60 can be executed by one or more processors disclosed here, and instructions for executing the method can be stored in memory.

As shown in FIG. 4, the method 60 begins at 62. At 64, the method 60 includes initiating playback of the video file. For example, this can include initiating the playback of the video file in response to receiving a request from a user via the vehicle display 18 (e.g., the user pressing the start/stop button 28). The user may initiate playback of the video file in response to various scenarios, including but not limited to, reviewing a past event (e.g., a vehicle impact, intrusion, or alert), inspecting a specific time range, or browsing stored recordings.

At 66, the method 60 includes parsing a header associated with the video file. For example, this can include parsing the header associated with the video file to extract metadata in response to initiating playback of the video file. The metadata may include, but is not limited to, file format information (e.g., MP4, AVI, KMV), a resolution (e.g., frame width and height), a frame rate (e.g., 30 fps), a bit rate, an aspect ratio, a frame count, a file size. The metadata is stored within the header of the video file.

At 68, the method 60 includes determining if the header is corrupt in response to the frame count of the video file being zero or an invalid number. The invalid number may include, but is not limited to, a negative number (e.g., −1). For example, this can include the header considered corrupt if the metadata associated with the header of the video file is 0 or −1 and the header not considered corrupt if the metadata associated with the header of the video file is 3600. If true (i.e., the header of the video file is considered corrupt), the method 60 continues to 70. If false (i.e., the header of the video file is not considered corrupt), the method 60 continues to 72.

At 70, the method 60 includes generating a replacement frame count. In some embodiments, the replacement frame count is calculated by dividing the file size of the video file by an average frame size. The average frame size is predetermined based on an analysis of multiple video files. For example, if the file size is 180 MB (i.e., 180,343,680 bytes) and the average frame size is 50 KB (i.e., 50,200 bytes), the replacement frame count would be 3,593 frames (i.e., 180, 343,680÷50,200).

In some embodiments, the replacement frame count is calculated by a product of the scaling factor and a result of dividing the file size of the video file by a predefined maximum encoded frame size. The predefined maximum encoded frame size is predetermined based on an analysis of multiple video files to determine the maximum size. The scaling factor is determined based on a comparison between the average frame size and the predefined maximum encoded frame size. The scaling factor scales the predefined maximum encoded frame size to the average frame size. For example, if the file size is 180 MB (i.e., 180,343,680 bytes), the scaling factor is 10, and the predefined maximum encoded frame size is 502 KB (i.e., 502,420 bytes), the replacement frame count would be 3590 frames (i.e., (180, 343,680÷502,420)×10). For example, this can include generating the replacement frame count for use during playback of the video file such that the frame count has a value that is not corrupt (e.g., zero or invalid).

Further, at 70, the method 60 includes determining the total duration of the video file based on the frame count and determining the current playback position of the video file relative to the total duration of the video file. For example, this can include determining the total duration of the video file and determining the current playback position of the video file such that the progress indicator 26 is corrected as illustrated in FIG. 3 rather than the progress indicator 26 that is not corrected as illustrated in FIG. 2.

At 72, the method 60 includes setting the frame count of the video file as the frame count. For example, this may include setting the frame count from the metadata as the frame count to be used during playback.

At 74, the method 60 includes displaying the progress indicator 26 associated with the video file during playback based on the frame count. For example, this may include displaying the progress indicator 26 that is corrected based on the frame count determined at 70 or the frame count set at 72.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for correcting a progress indicator during playback of a video file, the method comprising:
- receiving a request to playback the video file generated from a plurality of vehicle cameras;
- parsing a header associated with the video file to extract metadata, wherein the metadata includes a frame count of the video file and a file size of the video file;
- determining that the header is corrupt based on the frame count being zero;
- generating a replacement frame count based on the file size of the video file, a frame size, and a scaling factor; and
- displaying the progress indicator during the playback based on the replacement frame count.

2. The method of claim 1, wherein the replacement frame count is calculated by dividing the file size of the video file by the frame size.

3. The method of claim 1, wherein the replacement frame count is calculated by a product of the scaling factor and a result of dividing the file size of the video file by the frame size.

4. The method of claim 1, wherein the frame size is an average size of a plurality of frames.

5. The method of claim 1, wherein the frame size is a predefined maximum encoded frame size of a plurality of frames.

6. The method of claim 1, wherein the method further comprises:

determining a total duration of the video file based on the replacement frame count;

determining a current playback position of the video file relative to a total duration of the video file; and updating the progress indicator to reflect the current playback position.

7. The method of claim 1, wherein the progress indicator is displayed on a vehicle display.

8. The method of claim 1, wherein the progress indicator includes a numerical value.

9. A system configured to correct a progress indicator during playback of a video file, the system comprising:

a plurality of vehicle cameras configured to generate the video file; and a controller configured to receive a request to playback the video file, parse a header associated with the video file to extract metadata, wherein the metadata includes a frame count of the video file and a file size of the video file, determine that the header is corrupt based on the frame count being zero, generate a replacement frame count based on the file size of the video file, a frame size, and a scaling factor, and display, on a vehicle display, the progress indicator during the playback based on the replacement frame count.

10. The system of claim 9, wherein the replacement frame count is calculated by dividing the file size of the video file by the frame size.

11. The system of claim 9, wherein the replacement frame count is calculated by a product of the scaling factor and a result of dividing the file size of the video file by the frame size.

12. The system of claim 9, wherein the frame size is an average size of a plurality of frames.

13. The system of claim 9, wherein the frame size is a predefined maximum encoded frame size of a plurality of frames.

14. The system of claim 9, wherein the controller is further configured to determine a total duration of the video file based on the replacement frame count;

determine a current playback position of the video file relative to a total duration of the video file; and update the progress indicator to reflect the current playback position.

15. A processor configured to execute instructions stored on a non-transitory computer-readable medium, wherein executing the instructions causes the processor to:

receive a request to playback a video file generated from a plurality of vehicle cameras;

parse a header associated with the video file to extract metadata, wherein the metadata includes a frame count of the video file and a file size of the video file;

determine that the header is corrupt based on the frame count being zero;

generate a replacement frame count based on the file size of the video file, a frame size, and a scaling factor; and display a progress indicator during the playback based on the replacement frame count.

16. The processor of claim 15, wherein the replacement frame count is calculated by dividing the file size of the video file by the frame size.

17. The processor of claim 15, wherein the replacement frame count is calculated by a product of the scaling factor and a result of dividing the file size of the video file by the frame size.

18. The processor of claim 15, wherein the frame size is an average size of a plurality of frames.

19. The processor of claim 15, wherein the frame size is a predefined maximum encoded frame size of a plurality of frames.

20. The processor of claim 15, wherein the instructions further causes the processor to determine a total duration of the video file based on the replacement frame count;

determine a current playback position of the video file relative to a total duration of the video file; and update the progress indicator to reflect the current playback position.

* * * * *